United States Patent [19]

Wyatt

[11] B 4,001,195

[45] Jan. 4, 1977

[54] COPOLYMERIZATION OF OLEFINS

[75] Inventor: Ronald John Wyatt, Runcorn, England

[73] Assignee: Imperial Chemical Industries Limited, London, England

[22] Filed: July 14, 1972

[21] Appl. No.: 271,743

[44] Published under the second Trial Voluntary Protest Program on March 16, 1976 as document No. B 271,743.

[52] U.S. Cl. .............................. 526/348; 526/126; 526/183; 526/194; 526/351; 526/352
[51] Int. Cl.$^2$ ............... C08F 210/00; C08F 212/00
[58] Field of Search ...................... 260/88.2, 80.78

[56] References Cited

UNITED STATES PATENTS

| | | | |
|---|---|---|---|
| 3,300,459 | 1/1967 | Natta et al. | 260/88.2 |
| 3,326,883 | 6/1967 | Kelley et al. | 260/94.9 |

FOREIGN PATENTS OR APPLICATIONS

| | | |
|---|---|---|
| 2,040,353 | 2/1971 | Germany |
| 1,314,828 | 4/1973 | United Kingdom |
| 951,022 | 3/1964 | United Kingdom |

OTHER PUBLICATIONS

Natta et al., in "Polymer Chemistry of Synthetic Elastomers," Part II, (Interscience, 1969), p. 683.

Primary Examiner—Joseph L. Schofer
Assistant Examiner—A. L. Clingman
Attorney, Agent, or Firm—Cushman, Darby & Cushman

[57] ABSTRACT

A process for the preparation of an amorphous, vulcanizable, elastomeric copolymer by copolymerization of ethylene and at least one α-olefin having from 3 to 10 carbon atoms e.g. propylene and optionally in the presence of at least one non-conjugated diene, using as catalyst a transition metal composition which is the product of reacting a transition metal complex of the general formula $$R_mMX_p \qquad (1)$$

with a substantially inert matrix material having a hydroxylic surface which is free from adsorbed water, where M is a transition metal of Groups IVA to VIA of the Periodic Table of the Elements, R is a hydrocarbon group or substituted hydrocarbon group, X is a monovalent ligand and $m$ and $p$ are integers, $m$ having a value from 2 to the highest valency of the metal M, and $p$ having a value from 0 to 2 less than the valency of the metal M, the copolymerization being effected in a diluent comprising the α-olefin or mixture of α-olefins which is in liquid form under the prevailing polymerization conditions.

12 Claims, No Drawings

COPOLYMERIZATION OF OLEFINS

This invention relates to a process for the production of vulcanisable, amorphous, elastomeric copolymers by copolymerisation of ethylene and an α-olefin, optionally in the presence of a suitable non-conjugated diene.

It is known to produce vulcanisable elastomeric copolymers by copolymerisation of ethylene and an α-olefin, optionally in the presence of a suitable non-conjugated diene, in the presence of a Ziegler-type catalyst. For optimum elastomeric properties in the copolymers, and in the vulcanised products derived therefrom, the copolymers are desirably amorphous, that is, show at most only a small amount of crystallinity on X-ray examination, and preferably no crystallinity on X-ray examination.

Hitherto, in order to produce such amorphous copolymers, it has been the practice to effect the polymerisation in the presence of a Ziegler catalyst which is soluble in the reaction medium. Such processes are generally carried out in a reaction medium in which the copolymer is soluble. Particularly suitable catalysts include Group I to III alkyls and alkyl halides, e.g. aluminium alkyls and alkyl halides, in combination with vanadium halides and oxyhalides.

Where the catalysts which have been used have been heterogeneous, that is, insoluble in the reaction medium, the copolymers produced have generally also been insoluble in the reaction medium and more crystalline than those produced with soluble catalysts due to the presence in the copolymers of blocks of polyethylene and/or poly(α-olefin). The increased crystallinity has the disadvantage that it results in an adverse effect on the elastomeric properties of the copolymers and in the vulcanised products derived therefrom.

It has been proposed to overcome this disadvantage to some extent by effecting the polymerisation in a selected medium in which the copolymer is soluble. However, this practice may not be entirely satisfactory as, for example, it may be necessary to effect the polymerisation at a low rate and to a low conversion of total monomer to polymer. In addition, production of the copolymer as a solution results in viscous solutions which may be difficult to handle and from which it may be inconvenient to separate the copolymer. For example, it may be necessary to separate the copolymer by precipitation of the copolymer with a non-solvent. Large amounts of non-solvents may be needed.

We have now found that with certain catalysts a selected polymerisation medium may be used in which the copolymer produced is insoluble and from which the copolymer is readily separable, and which generally results in the production of a copolymer which is amorphous, that is, which shows at most only a small amount of crystallinity on X-ray examination.

According to the present invention there is provided a process for the preparation of an amorphous, vulcanisable, elastomeric copolymer by copolymerisation of ethylene and at least one α-olefin having from 3 to 10 carbon atoms, in the presence of, as polymerisation catalyst, a transition metal composition which is the product of reacting a transition metal complex of the general formula

 (1)

with a substantially inert matrix material having a hydroxylic surface (as hereinafter defined) which is free from adsorbed water, wherein M is a transition metal of Groups IVA to VIA of the Periodic Table of the Elements, R is a hydrocarbon group or substituted hydrocarbon group, X is a monovalent ligand and $m$ and $p$ are integers, $m$ having a value from 2 to the highest valency of the metal M, and $p$ having a value from 0 to 2 less than the valency of the metal M, the copolymerisation process being effected in a diluent comprising the α-olefin or mixture of α-olefins which is in liquid form under the prevailing polymerisation conditions.

The Periodic Table of the Elements referred to is that contained in Advanced Inorganic Chemistry (2nd Edition) by F.A. Cotton and G. Wilkinson (Interscience 1966).

In our co-pending British Patent Application numbered 40416/69 and 40417/69, now published as German OLS 2,040,353, we described the preparation of certain transition metal compositions and their use in the polymerisation of olefinically unsaturated monomers. The aforementioned compositions may be used in the polymerisation process of the present invention.

In the transition metal complex suitable groups R include alkyl and alkenyl groups (including π-alkenyl groups, e.g. π-allyl) and substituted derivatives thereof.

A preferred class of organic transition metal complexes, many of which are particularly useful as polymerisation initiators, are those in which one or more of the groups, or ligands, R are substituted alkyl gruops of general formula

 (2)

σ-bonded to the transition metal through the carbon atom as indicated. In this general formula Y represents an atom or group capable of interaction with the vacant d-orbitals of the metal M. Preferably all of the groups R have this formula, but it is possible for some of them to comprise other hydrocarbon groups.

Suitable substituent groups Y include aromatic and polyaromatic groups such as phenyl and naphthyl, giving rise, in formula (2) above, to the alkaryl ligands benzyl and (1-methylene-1-naphthyl) and ring substituted derivatives thereof, for example p-methyl benzyl.

Y may also be a cycloalkenyl group, e.g. a cyclooctenyl group.

In one or more of the groups R having the general formula —CH₂Y, Y may be a group having the formula -Z(R')₃ where Z represents carbon, silicon, germanium, tin or lead, and R' represents a hydrocarbon group or hydrogen, preferably an alkyl group. In the group having the formula —Z(R')₃ Z may suitably be carbon or silicon and R' may suitably be methyl, in which case the group —CH₂Y is neopentyl or trimethyl silyl methylene respectively.

In the transition metal complex of formula R$_m$MX$_p$ the transition metal M may suitably be titanium, vanadium, chromium or zirconium.

Examples of this preferred class of transition metal complexes include zirconium tetrabenzyl, titanium tetrabenzyl, zirconium tetrakis (neopentyl), zirconium tetrakis (trimethyl silyl methylene), chromium tetrakis (trimethyl silyl methylene), vanadium tetrabenzyl, vanadium tetrakis (trimethyl silyl methylene), titanium tetrakis (trimethyl silyl methylene), titanium tetrakis (neopentyl) and zirconium tris(allyl) bromide.

Preferably, the transition metal M is zirconium or titanium on account of the catalytic activity of transition metal compositions containing zirconium or titanium in the production of ethylene /α-olefin copolymers.

By a "hydroxylic surface" we mean a plurality of —OH groups attached to the surface of the matrix material, the hydrogen atom of the —OH group being capable of acting as a proton source, that is, having an acidic function. Such a material will be "substantially inert" in that, whereas the said —OH groups are capable of reacting with, say, the transition metal hydrocarbyl complex, the bulk of the matrix material is chemically inert. Particularly good examples of such matrix materials are silica and alumina or mixtures thereof. These comprise a matrix of silicon or aluminium and oxygen atoms, to the surface of which —OH groups are attached, the hydrogen atoms of said groups having an acidic function. However, apart from the presence of these —OH groups, silica and alumina are generally regarded as chemically inert. Within the terms silica and alumina we include silica and alumina based materials containing small amounts of other suitable inorganic oxides, such as magnesium oxide and zinc oxide.

It is essential that the matrix material is freed from adsorbed water, as this would merely react with and destroy the transition metal complex. The matrix materials may be readily freed from such adsorbed water by, for example, a simple thermal treatment.

The reaction between the transition metal complex and matrix material comprises displacement of one or more of the hydrocarbon groups by the hydrogen atom of an —OH group or groups, with liberation of the corresponding free hydrocarbon. The reaction may be represented by the following equation:

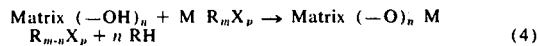

$$\text{Matrix } (-OH)_n + M\ R_m X_p \rightarrow \text{Matrix } (-O)_n M\ R_{m-n} X_p + n\ RH \quad (4)$$

wherein M, R, X, m and p have the meanings previously ascribed to them and n is an integer being not more than (m−1). It has been found that when the defined components of the transition metal compositions are reacted, all except one of the groups R of the organo-metallic compound may be displaced by -OH groups of the matrix, so that there is at least always one group R attached to the transition metal in the product. This appears to be independent of the number of reactable hydroxylic groups (as hereinafter defined) present on the surface of the matrix.

The term Matrix (—OH)$_n$ represents an inert matrix having at least n reactable hydroxylic groups attached to its surface. The number of reactable hydroxylic groups, that is, the number available for the reaction, will depend on the nature and condition of the matrix material. For example, in some materials, because of their molecular configuration, some of the hydroxylic groups present are not reactive with the transition metal complex. Thus, it is usual to react the matrix, at least initially, with an excess of transition metal complex, so that the number of hydroxylic groups available for the reaction may be determined.

The progress of the reaction in the manner indicated in equation (4) above may be readily followed by monitoring the evolution of free hydrocarbon RH, in the case where R is a hydrocarbon group, or by monitoring the colour change in the reactants. The fact that the product is a chemical entity, not a physical mixture, ie. a transition metal complex physically adsorbed on a granular matrix, may be demonstrated by removing the product, a coloured, insoluble composition, from the reactants and washing it with a solvent which would remove any adsorbed complex from the matrix. When this is done, the complex remains on the matrix. Contrary to this, when the complexes are mixed with an inert matrix containing no reactive hydroxylic groups, for example silica which has been calcined at 1200°C, although the complex is adsorbed on the matrix, it is readily removed by washing the product with a solvent.

As previously mentioned, the number of reactive hydroxylic groups present in a given weight of matrix will depend upon its nature, for example, whether it is silica or alumina, and its conditions, for example, its surface area and the treatment it has received to remove adsorbed water. Thus, the precise composition of transition metal compositions may vary from one batch or sample to another of the same matrix material, but successive portions of the same material prepared under identical conditions will give products having the same composition.

Transition metal compositions may be prepared by contacting a solution of the transition metal complex with a suitable matrix material, in the absence of free or adsorbed water. The solvent used for the complex should be dry and inert; hydrocarbon solvents are preferred. Since many of the transition metal complexes are thermally unstable, the reaction temperature must be maintained low enough to avoid decomposition of the complex. With some complexes, temperatures below 0°C are required.

The ratio of transition metal organo-metallic complex to matrix material may be varied within wide limits depending upon the physical and chemical nature of the components used, but it is preferred that the proportions are chosen so that each reactable group R reacts with a hydroxylic group.

Two methods of preparing transition metal compositions which allow precise and reproducible control of the composition (within the provisos mentioned above) will now be described. A first method comprises suspending the matrix material, which has previously been freed from water, in an inert liquid, and titrating the reactable hydrocylic groups with a solution of the transition metal complex in an inert solvent. Since most transition metal complexes are strongly coloured, the end-point is readily detectable by the presence of a permanent colouration in the suspending solvent. In compositions prepared in this way, all the reactable hydroxylic groups of the matrix are reacted with the metal complex. The compositions produced may then be recovered by filtration from the reaction medium, freed from solvent and stored dry under solvent in oxygen-free conditions.

It is possible to add less than the complete titre of transition metal complex, or even to add excess transition metal complex, but when excess complex is used, it will remain in the reaction medium when the composition is separated.

A second method for preparing transition metal compositions comprises, first, adding excess of either transition metal complex or a Grignard reagent (magnesium hydrocarbyl compound) to the matrix material, determining the number of molecules of hydrocarbon liberated, and then adding to a further sample of the matrix material just sufficient of the appropriate transition metal complex to liberate an equivalent amount of hydrocarbon. For example, a sample of the matrix material may be suspended in a solvent and excess of a transition metal π-allylic compound added. The volume of propylene produced is measured and related to the weight of matrix material. A second sample of the matrix material is then taken and a transition metal π-allylic compound added until the volume of propylene produced per gram of matrix material present is equivalent to that determined by addition of excess transition metal complex.

As already mentioned, the compositions may be separated from the media in which they are produced and exist as chemical entities of definite composition. In many cases they are more thermally stable than the transition metal complexes from which they are produced. For example, Zr(π-allyl)$_3$Br decomposes at −20°C whereas a composition formed by reacting Zr(π-allyl)$_3$ Br with silica is stable up to 60°C.

A preferred α-olefin for use in the process of our invention is propylene on account of its availability and cost, although other α-olefins may be used, e.g. butene-1, pentene-1 or hexene-1. Mixtures of α-olefins may be used if desired.

In the copolymers produced by the process of our invention it is desirable that throughout the macromolecular chains there should be as regular a distribution of ethylene and α-olefin units as possible, and moreover that the macromolecular chains should be of substantially similar composition with respect to ethylene and α-olefin. To this end it is desirable that the contents of the polymerisation vessel be stirred as efficiently as possible and that the proportion of ethylene to α-olefin in the polymerisation vessel be maintained substantially constant during the polymerisation. Thus, as the catalysts used in the process of our invention generally polymerise ethylene at a greater rate than propylene it may be necessary to add ethylene continuously to the polymerisation vessel during the polymerisation in order to maintain the proportion of ethylene to α-olefin within the liquid phase substantially constant.

Suitably, the process may be effect by charging ethylene, α-olefin, and catalyst continuously to a polymerisation vessel and continuously removing from the polymerisation vessel the copolymer product, catalyst, and unconverted ethylene and α-olefin which may, if desired, be recirculated.

The proportion of ethylene to α-olefin in the polymer is determined by the porportion of ethylene to α-olefin in the liquid phase and the latter proportion should thus be chosen to give the desired proportion of ethylene to α-olefin in the polymer. This latter proportion may readily be determined by means of simple experiment, for example, by infra-red analysis.

It is preferred to use ethylene and α-olefin, or mixture of α-olefins, in a proportion so as to yield in the copolymer product a proportion of ethylene: α-olefin units in the range 20:80 to 80:20 parts by mole, more preferably a proportion in the range 30:70 to 70:30 parts by mole.

The polymerisation may suitably be effected at a temperature in the range 10°C to 80°C although temperatures outside this range may be used if desired. As the temperature of polymerisation may be above the temperature at which the liquid α-olefin boils at normal pressure, especially where the latter is propylene, it may be necessary to effect the polymerisation at a pressure above atmospheric in a suitable pressure vessel, e.g. an autoclave, and clearly the boiling point of the α-olefin at the reaction pressure must be greater than the reaction temperature.

It may also be necessary to cool the contents of the polymerisation vessel particularly in order to remove therefrom the heat generated during polymerisation and thus maintain the desired temperature.

The catalyst concentration may suitably be in the range 0.1 to 2.0 m moles, preferably 0.01 to 1.0 m moles of transition metal complex per litre of liquid α-olefin polymerisation medium, although concentrations outside this range may be used if desired.

The polymerisation medium may include hydrogen as a molecular weight regulator.

Our process should be effected under an atmosphere substantially free of oxygen, for example, under an atmosphere of an inert gas, e.g. nitrogen, or of the monomers to be polymerised, and also using apparatus which has been carefully freed from impurities such as oxygen, water and other substances which would otherwise react with the catalyst or interfere with the polymerisation reaction, e.g. acetylene.

The copolymer produced by our process is insoluble in the liquid α-olefin polymerisation medium and may readily be separated therefrom, for example, by filtration, or, where the α-olefin is normally gaseous at ambient temperature, merely by venting of the α-olefin from the polymerisation vessel.

In view of the low catalyst concentration used in our process, the inert nature of the support, and the generally low halide content of the organo-metallic component of the catalyst, it is not generally necessary to "de-ash" the copolymer produced.

The molecular weight of the copolymer may be regulated by using chain transfer agents in the polymerisation.

The process of our invention may be used to produce copolymers of ethylene and at least one α-olefin which are substantially free of unsaturation. Where it is desired to produce a copolymer containing unsaturated sites through which the copolymer may be vulcanised the copolymerisation is effected in the presence of at least one copolymerisable non-conjugated diene. By non-conjugated diene we mean a compound containing at least two non-conjugated ethylenically unsaturated double bonds.

Suitable non-conjugated dienes include, for example, straight chain dienes, e.g. 1:4-hexadiene, 1:5-hexadiene, 1:6-octadiene and 1:7-octadiene, and alkenyl cycloalkenes e.g. 4-alkenyl cyclohexenes of structure

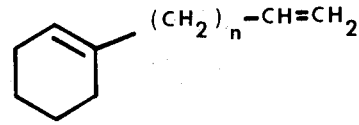

where $n$ is zero or a whole number of 1 to 3, or derivatives thereof in which one or more of the hydrogen atoms in the —CH=CH$_2$ groups is replaced by a hydrocarbyl substituent, e.g. an alkyl group. Particularly suitable on account of its availability and cost is 4-vinyl cyclohexene. Other alkenyl cycloalkenes which may be mentioned include 4-allyl cyclohexene-1, 1-allyl cyclohexene-1, 1-butene-3-yl-cyclohexene-1, 3,5-dimethyl-4-vinyl cyclohexene-1 and 3-methyl-1-butene-3-yl-cyclopentene-1.

Other non-conjugated dienes which may be mentioned include cyclic dienes in which both unsaturated groups are in the same ring e.g. 1:5-cyclooctadiene and fused bicyclic dienes in which each unsaturated group is in a separate ring, e.g. 4:7:8:9-tetrahydroindene.

Other non-conjugated dienes which are also suitable are those in which at least one of the unsaturated groups forms part of an endoalkylene bridged ring, e.g. ethylidene norbornene and propenyl norbornene.

The concentration of non-conjugated diene used in the polymerisation medium should be chosen in order to achieve the desired concentration of units derived from the diene in the copolymer product. In order to achieve a substantially constant rate of incorporation of the diene into the copolymer throughout the polymerisation it may be necessary, particularly with the more reactive dienes, to add fresh diene to the polymerisation medium periodically or continuously throughout the polymerisation. The concentration of units in the copolymer derived from the non-conjugated diene may suitably be in the range 1% to 10% of such units by weight of the copolymer.

The copolymer produced by the process of our invention may be vulcanised by methods known in the art. For example, where the copolymer is formed of ethylene and at least one α-olefin in the absence of non-conjugated diene, and is thus substantially free of unsaturation, the copolymer may be vulcanised by incorporating therein a thermally activatable free radical generator, for example, a peroxide, e.g. dicumyl peroxide, and shaping and heating the copolymer at a temperature sufficient to achieve vulcanisation.

Where the copolymer contains unsaturated units derived from a non-conjugated diene the copolymer may be cured by reaction of the unsaturated units with sulphur and accelerators conventionally used in the vulcanisation of unsaturated olefin copolymers.

Prior to vulcanisation, plasticisers, oil extenders, antioxidants, antioxonants and/or colouring matter may be incorporated into the copolymer. In order to increase the strength of the vulcanised copolymers it is particularly desirable to incorporate fillers, e.g. carbon black, calcium carbonate, into the copolymer prior to vulcanisation.

The invention is now illustrated by the following Examples.

PREPARATION OF INITIATORS

A high purity γ alumina (supplied by Koninklijke Zwavelzuurfabricken v/h Ketjen NV as Grade B alumina) was dried by heating at 500°C for 2 hours under an atmosphere of dry nitrogen. It was then cooled under an atmosphere of dry nitrogen and suspended in dry oxygen-free toluene.

A sample of the suspension was titrated with a solution of titanium tetrabenzyl in toluene, the end point being indicated by a permanent colour in the suspending solvent. Step-wise addition of the same titanium complex to a further sample of the alumina suspension showed that two molecules of toluene were evolved per molecule of titanium complex.

A titanium tetrabenzyl/γ alumina composition was prepared by adding 0.4 millimoles of titanium tetrabenzyl per gram of dried γ alumina suspended in toluene.

The above procedure was repeated to prepare transition metal complex/γ alumina compositions containing 0.4 millimoles of transition metal complex per gram of γ alumina. The following transition metal complexes were used:
titanium tetrakis (trimethylsilyl methylene)
titanium tetrakis (neopentyl)
zirconium tetrabenzyl
zirconium tetrakis (trimethylsilyl methylene)
zirconium tetrakis (neopentyl)
vanadium tetrakis (trimethylsilyl methylene)
vanadium tetrabenzyl
chromium tetrakis (trimethylsilyl methylene)
zirconium tris(allyl) bromide

EXAMPLE 1

A 1 liter stainless steel autoclave equipped with a stirrer, inlets for monomers and catalysts, a heating coil forming a jacket around the autoclave, a cooling coil, a pressure gauge, and a thermocouple for measurement of temperature was dried and oxygen was removed by evacuating the autoclave to high vacuum while heating at a temperature of 160°C. The autoclave was then flushed with dry oxygen-free ethylene. 500ml of oxygen-free and water-free liquid propylene were charged to the autoclave, the temperature of the autoclave was maintained at 20°C and the autoclave was pressurized with ethylene to a total pressure of 170 lb. per sq. in. g.

The contents of the autoclave were stirred and polymerisation was initiated by charging to the autoclave sufficient titanium tetrabenzyl/γ alumina suspension to provide 0.2 m moles of titanium tetrabenzyl in the autoclave.

During the polymerisation pressure was maintained at 170 lb. per sq. in. g. by continuously charging ethylene to the autoclave and the temperature was maintained constant at 20°C. After 54 minutes the autoclave was vented and 98 g. of rubbery particulate polymeric product removed therefrom.

The product had a propylene content of 52% by weight. X-ray examination and examination by differential scanning calorimetry of a sample which had been annealed to induce crystallinity indicated the sample was substantially amorphous (total crystallinity was <1%).

EXAMPLE 2

The procedure of Example 1 was followed except that polymerisation was initiated with a zirconium tetrabenzyl/γ alumina composition containing 0.3 m moles of zirconium tetrabenzyl and the temperature and total pressure were maintained at, respectively 30°C and 255 lb. per sq. in. g. during polymerisation.

After 15 minutes polymerisation the autoclave was vented and 56 g. of a rubbery polymeric product removed therefrom.

The product had a propylene content of 51% by weight and had a glass rubber-transition temperature of −54°C.

EXAMPLE 3

The procedure of Example 1 was followed except that the polymerisation was initiated with a zirconium tetrabenzyl/γ alumina composition containing 0.3 m moles of zirconium tetrabenzyl and 5 ml. of 5-ethylidene-2-norbornene were added to the autoclave simultaneously with the initiator. During polymerisation the temperature was maintained at 30°C and the total pressure at 240 lb. per sq. in. g. and after 30 minutes the autoclave was vented.

42 g. of a rubbery ethylene/propylene/5-ethylidene-2-norbornene copolymer were produced having a propylene content of 30% by weight.

EXAMPLE 4

In three separate experiments the procedure of Example 1 was followed except that a 4 litre autoclave was used, the autoclave was charged with 2.3 litres of liquid propylene and 0.4 millimoles of transition metal complex in the form of a transition metal/γ alumina composition, the nature of the transition metal complex/γ alumina composition used as catalyst was varied, the temperature of polymerisation was 50°C and the time of polymerisation 60 minutes, in the experiments the autoclave was charged with hydrogen to a partial pressure of 15 lb. per sq. in. g. over the vapour pressure of the liquid propylene, and in each experiment the ethylene was charged to the autoclave to the desired pressure over the combined pressure of the hydrogen and the vapour pressure of the liquid propylene and then fed continuously so as to maintain the total reaction pressure constant during polymerisation. The results were as follows:

| Experiment | Transition Metal Complex | Ethylene Pressure psig | Copolymer Yield gram | Weight% propylene in copolymer | % Crystallinity after annealing |
|---|---|---|---|---|---|
| A | Zr(tetrabenzyl) | 150 | 425 | 39 | 5.3 |
| B | Zr tetrakis (trimethylsilyl methylene) | 70 | 385 | 51 | 1.3 |
| C | Zr tetrakis (neopentyl) | 100 | 240 | 52.5 | 1.8 |

In three separate experiments 100 parts by weight of each of the copolymers produced in Experiments A, B and C was compounded at 100°C to 120°C in a Brabender Plastograph with 40 parts of HAF carbon black, 5 parts of zinc oxide, 1 part of stearic acid, 6 parts of Tetilox F40, a peroxide curing agent, and 0.45 part of sulphur.

Each of the compounded mixtures was charged to a 150 mm × 150 mm × 1 mm deep mould and the mixtures were cured by heating in a hydraulic press at 170°C for 20 minutes. The cured sheets were removed from the moulds.

Dumbell-shaped samples cut from the cured sheets were tested on a Monsanto-Hounsfield Rubber Testing machine at 50 cm min$^{-1}$ with the following results.

| Experiment | Stress Kg cm$^{-2}$ | | | Tensile Strength Kg cm$^{-2}$ | Elongation to break % |
|---|---|---|---|---|---|
| | 100% | 200% | 300% | | |
| A | 80 | — | — | 112 | 170 |
| B | 51 | 117 | — | 152 | 250 |
| C | 45 | 105 | — | 135 | 240 |

EXAMPLE 5

The polymerisation procedure of Example 4 was followed except that the nature of the transition metal in the transition metal complex/γ alumina composition which was used was varied, the pressures of hydrogen over the vapour pressure of liquid propylene and of ethylene over the combined pressure of the hydrogen and the vapour pressure of the liquid propylene were varied, and in experiment 0.8 millimoles of transition metal complex was charged to the autoclave. The results were as follows.

| Experiment | Transition metal Complex | Ethylene pressure p.s.i.g. | Hydrogen pressure p.s.i.g. | Copolymer Yield gram | Weight % Propylene copolymer | % Crystallinity after annealing |
|---|---|---|---|---|---|---|
| A | Ti tetrabenzyl | 120 | 35 | 255 | 52 | 2.8 |
| B | Ti tetrakis (trimethylsilyl methylene) | 165 | 45 | 665 | 54 | 1.0 |
| C | Ti tetrakis (neopentyl) | 120 | 35 | 291 | 53 | 1.1 |

EXAMPLE 6

In five separate experiments the procedure of Example 4 was followed except that in experiments A, B and C the nature of and the amount of transition metal complex in the form of transition metal complex/γ alumina composition which was used was varied, the pressures of hydrogen over the vapour pressure of liquid propylene and of ethylene over the combined pressure of the hydrogen and the vapour pressure of the liquid propylene were varied, and in experiment A the polymerisation was effected for 40 minutes.

The results were as follows:

| Experiment | Transition Metal Complex Millimoles | ethylene pressure p.s.i.g. | Hydrogen pressure p.s.i.g. | Copolymer Yield gram | Weight% propylene in copolymer | % Crystallinity after annealing |
|---|---|---|---|---|---|---|
| A | V tetrakis (trimethylsilyl methylene) | 35 | 5 | 15 | 35 | — |

-continued

| Experiment | Transition Metal Complex Millimoles | ethylene pressure p.s.i.g. | Hydrogen pressure p.s.i.g. | Copolymer Yield gram | Weight% propylene in copolymer | % Crystallinity after annealing |
|---|---|---|---|---|---|---|
| B | 0.68 millimole V tetrabenzyl 1 millimole | 35 | 5 | 37 | 40 | — |
| C | Cr tetrakis (trimethylsilyl methylene) 0.68 millimole | 80 | 10 | 51 | 21 | — |
| D | Zr tetrakis (trimethylsilyl methylene) 0.4 millimole | 50 | 15 | 222 | 74 | 0.2 |
| E | Zr tetrakis (neopentyl) 0.4 millimole | 50 | 20 | 174 | 61.5 | 1.1 |

EXAMPLE 7

The procedure of Example 4 was followed under the conditions indicated, and using the transition metal complex/γ alumina compositions indicated in the following table. In each experiment a non-conjugated diene was charged to the autoclave prior to the transition metal complex/γ alumina composition.

| Experiment | Transition Metal Complex millimoles | Temperature °C | Ethylene pressure p.s.i.g. | Hydrogen pressure p.s.i.g. | Diene ml | Polymerisation time mins. |
|---|---|---|---|---|---|---|
| A | Zr tetrakis (trimethylsilyl methylene) 0.6 millimole | 80 | 120 | 5 | Ethylidene norboinene 20 | 60 |
| B | Zr tetrakis (neopentyl) 0.6 millimole | 80 | 45 | 3 | " 30 | 20 |
| C | Zr tetrakis (trimethylsilyl methylene) 0.4 millimole | 50 | 30 | — | propenyl norbornene 45 | 40 |
| D | " " | 50 | 30 | 5 | 1:4-hexa-diene 30 | 40 |
| E | Zr tetrakis (trimethylsilyl methylene) 0.6 millimole | 70 | 30 | 5 | 1:6-octa-diene 75 | 40 |
| F | " " | 70 | 30 | 5 | 1:7-octa-diene 75 | 40 |

The pressure of hydrogen recorded was the pressure of hydrogen over the vapour pressure of liquid propylene and the pressure of ethylene the pressure over the combined pressure of hydrogen and vapour pressure of liquid propylene.

Details of the results obtained are given in the following table.

| Experiment | Copolymer Yield gram | Weight% propylene in copolymer | % crystallinity after annealing | Iodine No. |
|---|---|---|---|---|
| A | 87 | 60 | 1.2 | 6.0 |
| B | 137 | 59 | 2.3 | 5.0 |
| C | 45 | 60 | — | — |
| D | 44 | — | 3.7 | — |
| E | 268 | 38 | — | — |
| F | 163 | 54 | 3.9 | — |

100 Parts of the copolymer of experiment A were compounded with 50 parts of HAF carbon black, 5 parts of zinc oxide, 1 part of stearic acid, 1.5 parts of sulphur, 1.5 parts of Vulcafor MS and 0.5 part of Vulcafar MBTS following the procedure described in Example 4.

A small sample of the compounded mixture was cured on a Wallace Shawbury curometer and shown to proceed to 95% of the maximum cure after 40 minutes at 160°C.

EXAMPLE 8

The procedure hereinbefore described was followed to prepare a transition metal initiator composition except that the Grade B alumina was replaced by a fumed alumina supplied by Cabot Corporation as Alon, the transition metal complex used was zirconium tris(allyl) bromide, and 0.3 millimole of transition metal complex per gram of alumina was used.

Thereafter, the procedure of Example 4 was followed except that the transition metal complex used was zirconium tris(allyl) bromide, the temperature used was 60°C, the partial pressures of hydrogen and ethylene were respectively 10 p.s.i.g. and 109 p.s.i.g., and polymerisation was effected for 35 minutes. 13 Gram of copolymer containing 32 weight % propylene was produced.

I claim:

1. A process for the preparation of an amorphous, vulcanisable, elastomeric copolymer of ethylene and propylene in a proportion in the range 20:80 to 80:20 parts by mole by copolymerisation of ethylene and propylene in the presence of, as polymerisation catalyst, a transition metal composition which is the product of reacting a transition metal complex of the general formula $$R_mMX_p \qquad (1)$$

with a substantially inert matrix material having a hydroxylic surface which is free from adsorbed water, wherein M is a transition metal of Groups IVA to VIA of the Periodic Table of the Elements, R is a hydrocarbon group or substituted hydrocarbon group, X is a monovalent ligand and $m$ and $p$ are integers, $m$ having a value from 2 to the highest valency of the metal M, and $p$ having a value from 0 to 2 less than the valency of the metal M, the copolymerisation process being effected at a temperature in the range of 10° to 80°C in a diluent consisting essentially of propylene or mixture thereof with another α-olefin which is in liquid form under the prevailing polymerisation conditions and in which the catalyst and copolymer are insoluble.

2. A process as claimed in claim 1 in which one or more of the groups R is or are substituted alkyl groups having the formula -CH$_2$Y where Y is an atom or group capable of interaction with the vacant $d$-orbitals of the metal M.

3. A process as claimed in claim 2 in which Y is a phenyl group.

4. A process as claimed in claim 2 in which in one or more of the groups R having the formula —CH$_2$Y Y is a group having the formula —Z(R')$_3$, where Z is an atom selected from the group consisting of carbon, silicon, germanium, tin and lead and R' represents a hydrocarbon group or hydrogen.

5. A process as claimed in claim 4 in which in the group having the formula —Z(R')$_3$ Z is an atom selected from the group consisting of carbon and silicon and R' is methyl.

6. A process as claimed in claim 1 in which the transition metal complex of formula R$_m$MX$_p$ M is a transition metal selected from the group consisting of titanium, vanadium, chromium and zirconium.

7. A process as claimed in claim 1 in which the transition metal complex of formula R$_m$MX$_p$ is selected from the group consisting of zirconium tetrabenzyl, titanium tetrabenzyl, zirconium tetrakis(neopentyl), zirconium tetrakis (trimethyl silyl methylene), chromium tetrakis (silyl trimethyl methylene), vanadium tetrabenzyl, vanadium tetrakis (silyl trimethyl methylene), titanium tetrakis (trimethyl silyl methylene), titanium tetrakis (neopentyl) and zirconium tris(allyl) bromide.

8. A process as claimed in claim 1 in which the matrix material is alumina.

9. A process as claimed in claim 1 in which the ethylene and propylene are used in proportions such as to yield a copolymer comprising ethylene and propylene in a proportion of 30:70 to 70:30 parts by mole.

10. A process as claimed in claim 1 in which the process is effected in the presence of at least one copolymerisable non-conjugated diene.

11. A process as claimed in claim 10 in which the non-conjugated diene or mixture thereof is selected from the group consisting of ethylidene norbornene, propenyl norbornene, 1:4-hexadiene, 1:6-octadiene and 1:7-octadiene.

12. A process as claimed in claim 1 in which the catalyst is present in a concentration in the range 0.1 to 1.0 m mole of transition metal complex per litre of liquid α-olefin.

* * * * *

UNITED STATES PATENT OFFICE
CERTIFICATE OF CORRECTION

Patent No. 4,001,195          Dated January 4, 1977

Inventor(s)  Ronald John Wyatt

It is certified that error appears in the above-identified patent and that said Letters Patent are hereby corrected as shown below:

In the heading of the patent, add:

--[30] Foreign Application Priority Data

July 21, 1971   United Kingdom....34188/71--

Signed and Sealed this

Twenty-fourth Day of May 1977

[SEAL]

Attest:

RUTH C. MASON  
Attesting Officer

C. MARSHALL DANN  
Commissioner of Patents and Trademarks